(12) United States Patent
Kullik et al.

(10) Patent No.: US 7,059,323 B2
(45) Date of Patent: Jun. 13, 2006

(54) INCUBATOR WITH OXYGEN METERING

(75) Inventors: Götz Kullik, Lübeck (DE); Jochim Koch, Ratzeburg (DE); Jörg-Uwe Meyer, Ratzeburg (DE)

(73) Assignee: Dräger Medical AG & Co. KGaA, Lübeck (DE)

( * ) Notice: Subject to any disclaimer, the term of this patent is extended or adjusted under 35 U.S.C. 154(b) by 35 days.

(21) Appl. No.: 10/802,294

(22) Filed: Mar. 17, 2004

(65) Prior Publication Data
US 2004/0215052 A1 Oct. 28, 2004

(30) Foreign Application Priority Data
Apr. 23, 2003 (DE) ................. 103 18 384

(51) Int. Cl.
*A61G 10/00* (2006.01)
(52) U.S. Cl. ............... 128/202.12; 128/202.13
(58) Field of Classification Search ........... 128/202.12, 128/202.13, 204.22, 205.11, 205.12; 600/21, 600/22
See application file for complete search history.

(56) References Cited

U.S. PATENT DOCUMENTS

| 3,680,557 | A | * | 8/1972 | Doniguian | ............. | 128/204.17 |
| 5,199,423 | A | * | 4/1993 | Harral et al. | ......... | 128/202.26 |
| 5,531,807 | A | * | 7/1996 | McCombs | ...................... | 95/26 |
| 5,746,806 | A |   | 5/1998 | Aylsworth et al. | | |
| 5,975,081 | A | * | 11/1999 | Hood et al. | ................. | 128/845 |
| 6,265,210 | B1 | * | 7/2001 | Silley et al. | ............. | 435/303.1 |
| 6,406,523 | B1 | * | 6/2002 | Connor et al. | ................ | 96/125 |
| 6,418,927 | B1 |   | 7/2002 | Kullik | | |
| 6,474,960 | B1 |   | 11/2002 | Hansmann | | |
| 6,482,637 | B1 | * | 11/2002 | Bair et al. | ............... | 435/286.6 |
| 6,629,525 | B1 | * | 10/2003 | Hill et al. | .............. | 128/202.26 |
| 6,641,521 | B1 | * | 11/2003 | Kolarovic | ..................... | 600/22 |
| 6,651,658 | B1 | * | 11/2003 | Hill et al. | .............. | 128/204.23 |
| 6,691,702 | B1 | * | 2/2004 | Appel et al. | ........... | 128/202.26 |
| 6,779,523 | B1 | * | 8/2004 | Luppi | ..................... | 128/205.26 |
| 6,805,122 | B1 | * | 10/2004 | Richey et al. | ......... | 128/205.18 |
| 6,827,760 | B1 | * | 12/2004 | Kutt et al. | ....................... | 95/8 |

FOREIGN PATENT DOCUMENTS

| DE | 3786213 | 9/1993 |
| DE | 196 17 739 C1 | 6/1997 |
| DE | 69320914 | 6/1999 |
| EP | 0260627 | 3/1988 |
| EP | 0597604 | 5/1994 |
| EP | 0770211 | 5/1997 |
| EP | 0 987 614 | 8/1997 |
| JP | 6105873 | 4/1994 |
| JP | 9206341 | 8/1997 |

(Continued)

OTHER PUBLICATIONS

Roche, 1999, Sauerstoffkonzentrator=oxygen concentrator, Roche Encyclopedia of Medicine.

*Primary Examiner*—Henry Bennett
*Assistant Examiner*—Dinnatia Doster-Greene
(74) *Attorney, Agent, or Firm*—McGlew & Tuttle, P.C.

(57) ABSTRACT

An incubator for premature and newborn patients is provided with a heater (6), and a fresh air flow (13) fed in with oxygen metering, characterized in that the incubator has an electrically operated oxygen concentrator (12), and an oxygen sensor (5) for measuring the oxygen concentration in the incubator, wherein the oxygen metering device (7) meters the oxygen released by the oxygen concentrator (12) into the fresh air flow (13) fed into the incubator.

16 Claims, 1 Drawing Sheet

FOREIGN PATENT DOCUMENTS

| | | |
|---|---|---|
| JP | 11000398 | 1/1999 |
| JP | 11019215 | 1/1999 |
| JP | 2001017549 | 1/2001 |
| WO | WO 9635944 | 11/1996 |

* cited by examiner

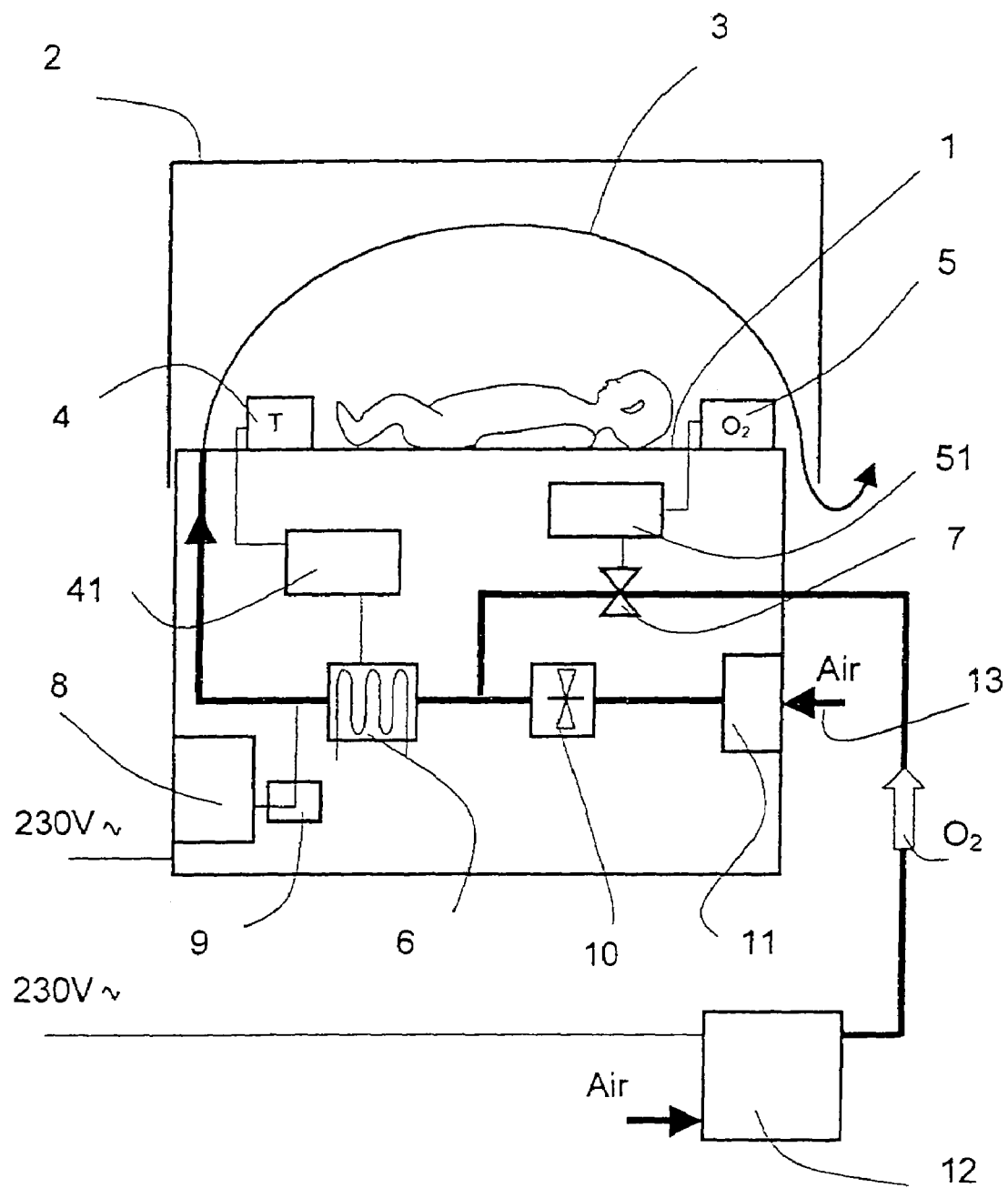

INCUBATOR WITH OXYGEN METERING

FIELD OF THE INVENTION

The present invention relates to an incubator for premature and newborn patients and pertains more particularly to a system, method and apparatus for monitoring the status of an infant being warmed or treated and controlling the operation of the incubator.

BACKGROUND OF THE INVENTION

An incubator of this type is described, e.g., in DE 196 17 739 C1, where air and oxygen are fed from pressurized gas cylinders. The supply of air and/or oxygen from a central gas supply unit is also mentioned here as an alternative, as it is known, for instance, from hospitals.

It is desirable to also use prior-art incubators outside hospitals, i.e., especially at home, where no central oxygen supply is available. The handling of pressurized oxygen cylinders is also relatively complicated, so that there is a need for an improved incubator of the type mentioned in the introduction, which can also be operated independently from a central gas supply unit.

SUMMARY OF THE INVENTION

Accordingly, the object of the present invention is to provide an incubator which guarantees a defined microclimate in terms of temperature, oxygen concentration and optionally humidity in the interior space of the incubator independently from a central gas supply unit and independently from pressurized oxygen cylinders.

According to the invention, an incubator for premature or newborn patients is provided with a heater, wherein a fresh air gas flow is fed in with oxygen metering. An essential advantage of the present invention is the use of an electrically operated oxygen concentrator as the oxygen source, so that existing incubators can also be conveniently used outside hospitals in the familiar home environment, especially also for the treatment of patients who do not require such an intensive care, as a result of which hospital costs may be possibly saved.

The electrically operated oxygen concentrator could provide a controlled degree of oxygen into the incubator in several different ways. For instance, one may be formed by a pressure swing absorber based on zeolite. Another possible oxygen concentrator can be formed by preferably stacking a plurality of solid electrolyte cells, which bring about a local oxygen enrichment due to a potential difference applied to the solid electrolyte cells.

The objective of the present invention may be advanced further by providing certain feedback system for the incubator. Specifically, the incubator itself may be provided with an oxygen sensor that is designed as an electrochemical measuring cell. The oxygen sensor may then be connected to the oxygen metering unit via an oxygen controller so that a preferred concentration of oxygen ratio is introduced into the incubator. In addition, the heater may be controlled as a function of the temperature measured in the interior space of the incubator by means of a temperature sensor.

The incubator may be provided with a humidifier which is operatively connected to introduce moisture into the interior space of the incubator.

Furthermore, the fresh air flow may be delivered into the incubator by means of a fan, preferably designed as a radial compressor.

According to another aspect of the invention, an incubator for premature and newborn patients has a fresh air delivering means providing a fresh gas flow to the incubator. A gas source is provided, preferably by an ambient air flow line. An electrically operated oxygen concentrator is connected to the ambient air fresh gas flow line for providing an oxygen concentration gas with a higher oxygen concentration than the ambient air. A metering device meters the oxygen concentration gas flow into the fresh gas flow. An oxygen sensor measures the oxygen concentration in the incubator. The metering device meters the oxygen concentration gas into the fresh gas flow based on the oxygen concentration in the incubator.

The fresh gas delivering means preferably includes a delivery line with an ambient air source and a fan (i.e., a blower, radial/rotary compressor, etc.) connected to the delivery line. The fresh gas flow is delivered into the incubator by the fan.

A heater may be arranged in the fresh gas flow to heat the fresh gas and a humidifier may be arranged in the fresh gas flow to introduce moisture into the incubator.

The oxygen sensor is preferably connected to the oxygen metering device via an oxygen controller.

According to another aspect of the invention a method is provided for delivering a controlled air flow to an incubator. The method comprises providing an incubator patient space and measuring an oxygen concentration in the incubator patient space. A gas source is treated to provide an oxygen concentrated gas. An oxygen concentration in the incubator is measured and the concentrated oxygen gas is metered into the incubator based on measured oxygen concentration in the incubator. The method may include providing a fresh gas flow into the incubator wherein the metering of the concentrated oxygen gas into the incubator includes metering the concentrated oxygen gas into the fresh gas flow.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1 is a schematic view of the system and arrangement according to an embodiment of the invention.

DESCRIPTION OF THE PREFERRED EMBODIMENT

Referring to the drawings in particular, FIG. 1 in a schematic view shows a preferred embodiment form of the incubator with oxygen metering according to the invention. Both the oxygen concentrator 12 and the components shown in the upper part of the figure are operated in the example being described in a practical manner with the usual supply/input voltage of 230 V a.c. in Europe or 110 V a.c. in the United States from the public electric network, the alternating current being rectified as needed for the operation of the components. The patient is located on a bed 1, which is extensively closed off from the ambient air by means of the incubator hood 2. A microclimate that is defined in terms of temperature, humidity and oxygen concentration is formed in the interior space of the incubator with a fresh gas flow 3. A controlled release of gas into the environment is provided through one or more gas openings at the incubator corresponding to the fresh air flow 13 fed in, which is enriched with oxygen. The oxygen concentrator 12 is preferably a pressure swing adsorber, e.g., one available commercially as Dräger Permox® SilentCare® and utilizes the property of prior-art zeolites of selectively better absorbing the nitrogen present in the air than the oxygen, so that the oxygen concentration relative to the volume of air can be raised from about 21% in the ambient air to about 95% by means of a small compressor and a few valves of the absorber. The fact that 100% oxygen concentration is not reached is rather advantageous for this application, because the oxygen concentration for the small patient must be limited to a value of about 40% because of the risk for going blind. The oxygen concentrator 12 may also be designed as a ceramic ionic conductor or generally as a solid electrolyte, e.g., "COGS" (Ceramic Oxygen Generation System) from Litton,® with the result that depending on the imposed current, oxygen enrichment can be observed in defined ranges, and the air enriched with oxygen is delivered to the incubator by means of a gas delivery unit.

Depending on the requirements on the tightness and on the removal of the carbon dioxide exhaled by the patient in the incubator to the environment, about 20 to 30 L of fresh gas are fed into the incubator per minute. Prior-art oxygen concentrators 12 based on pressure swing adsorption deliver about 6 L per minute at 95% oxygen concentration, and a desired maximum oxygen concentration of about 38% is thus obtained in the case of a fresh air flow 13 of about 20 L of ambient air per minute in the case of a total fresh gas flow 3 of 26 L per minute into the interior space of the incubator. The inflow of the fresh air flow 13 is achieved by means of the fan 10 and set to a constant value of about 20 L per minute by the flow resistance of the inlet line and the sterilizing filter 11. The fan may be designed as a rotary compressor as described in U.S. Pat. No. 6,418,917 or a radial compressor as described in U.S. Pat. No. 6,474,960, both of which are incorporated herein by reference. The fresh gas flow 3 is monitored, e.g., on the basis of the electric data of the blower 10, namely, the current, the voltage and the speed, so that an increased resistance of the sterilizing filter 11 can also be recognized hereby. The oxygen concentration is controlled after the measurement of the current oxygen concentration in the interior space of the incubator by means of the oxygen sensor 5, which has preferably an electrochemical measuring cell. The measured signal of the oxygen sensor 5 reaches the oxygen controller 51, which meters the oxygen into the fresh air flow 13 by means of an oxygen metering unit 7 designed as a control valve.

The incubator has a special electric control valve with large cross section for metering the low-pressure oxygen from the oxygen concentrator 12. If the oxygen concentration control is done away with as an alternative, oxygen is admixed in the known manner with the control valve opened without oxygen controller 51. The oxygen volume flow is measured with a flow meter in this case. Measurement of the oxygen concentration by means of the oxygen sensor 5 with a downstream optical and/or acoustic alarm function is always meaningful for the reliability of the operation of the incubator and the patient's safety.

The temperature in the interior space of the incubator is determined with the temperature sensor 4 and is used via the temperature controller 41 for setting the heater 6 for the fresh air flow 13, which arrives from the oxygen concentrator 12 and is enriched with oxygen.

The humidifier 9 is preferably likewise operated electrically and is supplied with water from the water reservoir 8. In particular, the humidifier 9 may be controlled as a function of the humidity of the air in the interior space of the incubator, which is currently measured by means of a humidity sensor. The humidifier 9 may be used in an especially simple manner with tap water and a built-in water softening means.

While a specific embodiment of the invention has been shown and described in detail to illustrate the application of the principles of the invention, it will be understood that the invention may be embodied otherwise without departing from such principles.

What is claimed is:

1. An incubator for premature and newborn patients with a heater and an oxygen metering device for delivering a fresh air flow into an interior space of the incubator, the incubator comprising:
    an electrically operated oxygen concentrator; and
    an oxygen sensor for measuring oxygen concentration in the incubator, wherein the oxygen metering device meters oxygen released by said oxygen concentrator into the fresh air flow fed into the incubator, said oxygen sensor being connected to said oxygen metering device via an oxygen controller;
    a heater for the fresh air flow enriched with oxygen is controlled as a function of a temperature sensing means measuring the temperature in the interior space of the incubator.

2. An incubator according to claim 1, wherein said oxygen concentrator is a material comprising one of a pressure varying absorber based on zeolite.

3. An incubator according to claim 1, wherein said oxygen concentrator is a material comprising one of a pressure varying absorber based on a plurality of solid electrolyte cells, which bring about a local oxygen enrichment because of a potential difference applied to said solid electrolyte cells.

4. An incubator according to claim 1, wherein said oxygen sensor is an electrochemical measuring cell.

5. An incubator according to claim 1, further comprising a fan, wherein the fresh air flow is delivered into the incubator by said fan.

6. An incubator according to claims 5, wherein said fan is a radial compressor.

7. An incubator according to claim 1, wherein a humidifier is arranged in the fresh air flow, which is fed into the incubator introducing moisture in the incubator.

8. An incubator for premature and newborn patients, the incubator comprising:
    an fresh air delivering means providing a fresh gas flow to the incubator, said fresh gas delivering means comprising a delivery line with an ambient air source and a fan connected to said delivery line, wherein the fresh gas flow is delivered into the incubator by said fan;
    an ambient air flow line;
    an electrically operated oxygen concentrator connected to said ambient air fresh gas flow line for providing an oxygen concentration gas with a higher oxygen concentration than the ambient air;
    a metering device for metering the oxygen concentration gas flow into the fresh gas flow; and
    an oxygen sensor for measuring oxygen concentration in the incubator wherein said metering device meters the oxygen concentration gas into the fresh gas flow based on the oxygen concentration in the incubator.

9. An incubator according to claim 8 wherein said oxygen concentrator comprises a pressure varying absorber based on zeolite.

10. An incubator according to claim 8 wherein said oxygen concentrator comprises a plurality of stacked solid electrolyte cells, which bring about a local oxygen enrichment because of a potential difference applied to said solid electrolyte cells.

11. An incubator according to claim 8, wherein said oxygen sensor comprises an electrochemical measuring cell.

12. An incubator according to claim 8, wherein said fan is a radial compressor.

13. An incubator according to claim 8, further comprising a heater arranged in the fresh gas flow to heat the fresh gas and a humidifier arranged in the fresh gas flow to introduce moisture in the incubator.

14. An incubator according to claim 8, wherein said oxygen sensor is connected to said oxygen metering device via an oxygen controller.

15. An incubator according to claim 8, further comprising:
   a heater arranged in the fresh gas flow to heat the fresh gas; and
   a temperature sensing means measuring the temperature in the interior space of the incubator wherein the heater for the fresh gas flow enriched with oxygen is controlled as a function of a temperature measured by said temperature sensing means.

16. A method for delivering a controlled air flow to an incubator, the method comprising the steps of:
   providing an incubator patient space;
   measuring oxygen concentration in the incubator patient space;
   treating a gas source to provide an oxygen concentrated gas;
   measuring an oxygen concentration in the incubator; and
   metering the concentrated oxygen gas into the incubator based on measured oxygen concentration in the incubator;
   providing a fresh gas flow into the incubator wherein said metering the concentrated oxygen gas into the incubator includes metering the concentrated oxygen gas into the fresh gas flow;
   measuring the temperature in the incubator;
   heating the fresh gas flow to control the heat delivered into the incubator based on measured heat temperature in the incubator;
   humidify the fresh gas flow.

\* \* \* \* \*